United States Patent
Wong et al.

(10) Patent No.: US 10,420,075 B2
(45) Date of Patent: Sep. 17, 2019

(54) CONFIGURING TRANSMISSIONS BY REMAPPING THE LOGICAL CHANNELS ONTO DIFFERENT ONE OF THE PLURALITY OF TRANSPORT CHANNELS

(75) Inventors: Shin Horng Wong, Chippenham (GB); Huy Thang Pham, Dollard-des-Orneaux (CA); Vikas Dhingra, Bangalore (IN); Jing Zhang, Kanata (CA); Jindong Hou, Swindon (GB)

(73) Assignee: Alcatel-Lucent, Nozay (FR)

( * ) Notice: Subject to any disclaimer, the term of this patent is extended or adjusted under 35 U.S.C. 154(b) by 144 days.

(21) Appl. No.: 14/237,801

(22) PCT Filed: Jul. 24, 2012

(86) PCT No.: PCT/EP2012/003111
§ 371 (c)(1), (2), (4) Date: Jul. 7, 2014

(87) PCT Pub. No.: WO2013/020651
PCT Pub. Date: Feb. 14, 2013

(65) Prior Publication Data
US 2015/0043442 A1    Feb. 12, 2015

(30) Foreign Application Priority Data
Aug. 10, 2011   (EP) .................................. 11360034

(51) Int. Cl.
*H04W 72/04*    (2009.01)
*H04W 72/12*    (2009.01)
(Continued)

(52) U.S. Cl.
CPC ....... *H04W 72/04* (2013.01); *H04W 72/1263* (2013.01); *H04W 76/27* (2018.02); *H04W 88/08* (2013.01)

(58) Field of Classification Search
CPC .. H04L 12/64; H04W 72/04; H04W 72/1263; H04W 76/046; H04W 88/08; H04W 76/27
See application file for complete search history.

(56) References Cited

U.S. PATENT DOCUMENTS 6,002,689 A      12/1999  Christie et al.
6,108,550 A  *   8/2000   Wiorek .............. H04W 74/002
                                                       370/329
(Continued)

FOREIGN PATENT DOCUMENTS

CN        1860808        11/2006
JP        2005-073087    3/2005
(Continued)

OTHER PUBLICATIONS

3GPP TS 25.331 version 4.8.0 Release 4 (Dec. 2002) (pp. 104-106).*
(Continued)

*Primary Examiner* — Dung B Huynh
(74) *Attorney, Agent, or Firm* — Fay Sharpe LLP (57) ABSTRACT

A method of configuring transmissions over a radio bearer between a base station and user equipment of a wireless telecommunication network, a base station, user equipment, a radio network controller and computer program products are disclosed. The method of configuring transmissions over a radio bearer between a base station and user equipment of a wireless telecommunication network comprises the steps of: preconfiguring the user equipment to support transmissions over a plurality of transport channels of the radio bearer, the plurality of transport channels being associated with a communication state of the user equipment, each of the plurality of transport channels being mappable with logical channels of the radio bearer, the logical channels providing information to be transmitted by the transport (Continued)

US 10,420,075 B2
Page 2 channels; and remapping the logical channels onto a different one of the plurality of transport channels in response to a message transmitted between the base station and the user equipment, the message indicating the different one of the plurality of transport channels to be used to support the transmissions between the base station and the user equipment. This approach enables the user equipment or base station to select a transport channel to carry the information from the logical channels autonomously of other network nodes within the network, such as, for example, the radio network controller. By avoiding the need to involve other network nodes in the reselection of the transport channel, rapid changes in the transport channel can be made based on knowledge of the current conditions within either the base station or the user equipment. This approach enables fast switching of the transport channel to improve the performance of the network.

36 Claims, 4 Drawing Sheets

(51) Int. Cl.
*H04W 76/27* (2018.01)
*H04W 88/08* (2009.01)

(56) References Cited

U.S. PATENT DOCUMENTS

| | | | | |
|---|---|---|---|---|
| 6,850,540 B1* | 2/2005 | Peisa | H04L 12/5601 | 370/395.4 |
| 8,737,241 B2* | 5/2014 | Pradas | H04W 74/08 | 370/236.1 |
| 2004/0114574 A1* | 6/2004 | Zeira | H04L 1/0002 | 370/352 |
| 2005/0152398 A1* | 7/2005 | Shin | H04L 12/1877 | 370/469 |
| 2005/0281222 A1* | 12/2005 | Ranta-Aho | H04W 76/046 | 370/328 |
| 2006/0034205 A1* | 2/2006 | Kim | H04W 76/002 | 370/312 |
| 2006/0039326 A1* | 2/2006 | Jeong | H04W 72/042 | 370/329 |
| 2006/0209896 A1* | 9/2006 | Choi | H04L 1/1874 | 370/469 |
| 2006/0223532 A1* | 10/2006 | Liu | H04W 8/02 | 455/436 |
| 2007/0014274 A1* | 1/2007 | Choi | H04W 72/0413 | 370/349 |
| 2007/0121552 A1* | 5/2007 | Lindoff | H04B 17/336 | 370/333 |
| 2007/0165595 A1* | 7/2007 | Xu | H04W 76/02 | 370/350 |
| 2007/0258402 A1* | 11/2007 | Nakamata | H04W 72/06 | 370/329 |
| 2008/0064390 A1* | 3/2008 | Kim | H04W 60/00 | 455/425 |
| 2008/0159218 A1 | 7/2008 | Dwarakanath | | |
| 2008/0175192 A1* | 7/2008 | Roberts | H04L 1/0017 | 370/329 |
| 2008/0182594 A1* | 7/2008 | Flore | H04W 76/046 | 455/458 |
| 2008/0254819 A1* | 10/2008 | Niwano | H04W 52/16 | 455/522 |
| 2008/0291878 A1* | 11/2008 | Zhang | H04W 72/1289 | 370/336 |
| 2009/0086671 A1* | 4/2009 | Pelletier | H04W 72/12 | 370/329 |
| 2009/0109912 A1* | 4/2009 | DiGirolamo | H04L 5/0053 | 370/329 |
| 2009/0109937 A1* | 4/2009 | Cave | H04W 74/0866 | 370/336 |
| 2009/0135769 A1* | 5/2009 | Sambhwani | H04L 5/0053 | 370/329 |
| 2009/0135771 A1* | 5/2009 | Pani | H04W 72/042 | 370/329 |
| 2009/0143074 A1* | 6/2009 | Pelletier | H04W 72/1284 | 455/452.2 |
| 2009/0154403 A1* | 6/2009 | Niwano | H04W 52/282 | 370/329 |
| 2009/0181710 A1* | 7/2009 | Pani | H04W 52/38 | 455/509 |
| 2009/0196230 A1* | 8/2009 | Kim | H04W 74/002 | 370/328 |
| 2009/0201871 A1* | 8/2009 | Sambhwani | H04W 72/0406 | 370/329 |
| 2009/0245203 A1* | 10/2009 | Pani | H04W 36/30 | 370/331 |
| 2009/0247161 A1* | 10/2009 | Pani | H04W 36/00835 | 455/435.3 |
| 2009/0268707 A1* | 10/2009 | Pani | H04L 1/18 | 370/345 |
| 2009/0268797 A1 | 10/2009 | Cunningham | | |
| 2010/0008320 A1* | 1/2010 | Yeo | H04L 29/06 | 370/329 |
| 2010/0020712 A1* | 1/2010 | Lee | H04W 24/10 | 370/252 |
| 2010/0034171 A1* | 2/2010 | Pelletier | H04W 36/0055 | 370/331 |
| 2010/0074203 A1* | 3/2010 | Pani | H04W 72/0413 | 370/329 |
| 2010/0195544 A1* | 8/2010 | Anderson | H04L 47/14 | 370/280 |
| 2010/0260108 A1* | 10/2010 | Song | H04W 72/04 | 370/328 |
| 2010/0285791 A1* | 11/2010 | Pirskanen | H04W 74/002 | 455/422.1 |
| 2010/0296464 A1* | 11/2010 | Barraclough | H04W 28/06 | 370/329 |
| 2011/0122783 A1* | 5/2011 | Lin | H04W 76/046 | 370/252 |
| 2011/0134757 A1* | 6/2011 | Lin | H04W 72/085 | 370/241 |
| 2011/0141996 A1* | 6/2011 | Yamada | H04W 72/0453 | 370/329 |
| 2011/0170495 A1* | 7/2011 | Earnshaw | H04W 72/02 | 370/329 |
| 2011/0194437 A1* | 8/2011 | Song | H04W 76/02 | 370/252 |
| 2011/0216732 A1* | 9/2011 | Maeda | H04W 48/08 | 370/329 |
| 2012/0033635 A1* | 2/2012 | Tang | H04L 12/4633 | 370/329 |
| 2012/0044870 A1* | 2/2012 | Mochizuki | H04B 7/024 | 370/328 |
| 2012/0163308 A1* | 6/2012 | Ke | H04L 5/0053 | 370/329 |
| 2012/0176951 A1* | 7/2012 | Pradas | H04W 74/006 | 370/312 |
| 2012/0250578 A1* | 10/2012 | Pani | H04W 48/12 | 370/254 |
| 2012/0250644 A1* | 10/2012 | Sambhwani | H04W 72/0413 | 370/329 |
| 2013/0039393 A1* | 2/2013 | Choi | H04L 1/1874 | 375/219 |
| 2013/0279450 A1* | 10/2013 | Anderson | H04L 47/14 | 370/329 |
| 2013/0301578 A1 | 11/2013 | Terry | | |
| 2013/0329652 A1* | 12/2013 | Pani | H04W 72/121 | 370/329 |
| 2015/0327083 A1* | 11/2015 | Pradas | H04W 74/08 | 370/328 |

FOREIGN PATENT DOCUMENTS

| | | |
|---|---|---|
| JP | 2006-304335 | 11/2006 |
| KR | 10-2009-0055899 | 6/2009 |
| RU | 2189706 | 9/2002 |

(56) References Cited

FOREIGN PATENT DOCUMENTS

| WO | WO 2004/102859 | 11/2004 |
|---|---|---|
| WO | WO 2005/015918 | 2/2005 |
| WO | WO 2009/132236 A2 | 10/2009 |

OTHER PUBLICATIONS

Nokia Siemens Networks et al., "Correction for Procedural Text on E-RNTI Allocation at E-DCH Serving Cell Change," $3^{rd}$ Generation Partnership Project (3GPP), 3GPP TSG-RAN WG3 Meeting #67, R3-100921, XP050424725, 8 pages, San Francisco, CA, USA, Feb. 22-26, 2010.

International Search Report for PCT/EP2012/003111 dated Aug. 31, 2012.

"$3^{rd}$ Generation Partnership Project; Technical Specification Group Radio Access Network; Radio Resource Control (RRC); Protocol specification (Release 9)" 3GPP TS 25.331 V9.4.0 (Sep. 2010), pp. 1, 200-203, 334-342, 755-758.

* cited by examiner

CONFIGURING TRANSMISSIONS BY REMAPPING THE LOGICAL CHANNELS ONTO DIFFERENT ONE OF THE PLURALITY OF TRANSPORT CHANNELS

FIELD OF THE INVENTION

The present invention relates to a method of configuring transmissions over a radio bearer between a base station and user equipment of a wireless telecommunication network, a base station, user equipment, a radio network controller and computer program products.

BACKGROUND

Wireless telecommunication systems are known. In those known systems, radio coverage is provided to user equipment, for example mobile telephones, by geographical area. A base station is located in each geographical area to provide the required radio coverage. User equipment in the area served by a base station receives information and data from the base station and transmits information data to the base station.

Information and data transmitted by the base station to the user equipment occurs on radio frequency bearers known as downlink bearers. Information and data transmitted by user equipment to the base station occurs on radio frequency bearers known as uplink bearers.

In known wireless communication systems, user equipment can move between geographical base station coverage areas or cells. The service provided to the user equipment is overseen by a radio network controller (RNC). The RNC communicates with user equipment and base stations and determines which base station each user equipment is primarily connected to. Furthermore, the RNC acts to control and communicate with a base station and user equipment when user equipment moves from one cell to another.

In order to facilitate transmission of information and data between the base station and user equipment, it is possible to configure the user equipment to operate in one of a number of different radio resource control (RRC) connection states. These different connection or communication states (such as cell_DCH, cell_FACH, cell_PCH or URA_PCH states) support different types of transmissions between the base station and user equipment to match the expected user traffic activity.

Although existing techniques facilitate transmissions between base stations and user equipment, lower than expected network performance can occur. Accordingly, it is desired to provide an improved technique for configuring transmissions.

SUMMARY

According to a first aspect, there is provided a method of configuring transmissions over a radio bearer between a base station and user equipment of a wireless telecommunication network, the method comprising: preconfiguring the user equipment to support transmissions over a plurality of transport channels of the radio bearer, the plurality of transport channels being associated with a communication state of the user equipment, each of the plurality of transport channels being mappable with logical channels of the radio bearer, the logical channels providing information to be transmitted by the transport channels; and remapping the logical channels onto a different one of the plurality of transport channels in response to a message transmitted between the base station and the user equipment, the message indicating the different one of the plurality of transport channels to be used to support the transmissions between the base station and the user equipment.

The first aspect recognises that a problem with existing approaches is that they lack the flexibility to make rapid reconfigurations of transmissions over a radio bearer between a base station and user equipment. For example, in the universal mobile telecommunications system (UMTS), user equipment with a radio resource control (RRC) connection can be configured into the cell_DCH, cell_FACH, cell_PCH or URA_PCH states. Cell_PCH and URA_PCH states are for user equipment with little or no traffic activity and the user equipment is put into a discontinuous reception cycle. User equipment with traffic is then put into either the cell_DCH or cell_FACH state where user data may be transmitted and received. The cell_FACH state is usually used by user equipment having low, bursty traffic activity.

Enhanced cell_FACH was introduced in Release 7, which enables the user equipment to receive high speed downlink packet access (HSDPA) in the cell_FACH state. This enables the user equipment to receive large bursts of downlink data. Release 8 introduced high speed uplink packet access (HSUPA) to enhanced cell_FACH, enabling the user equipment to also send large bursts of uplink data in the cell_FACH state. The bursty nature of smartphone traffic is suited to the enhanced cell_FACH state, since it uses HSDPA and HSUPA resources more efficiently than when in the cell_DCH state. The number of smartphone devices is expected to increase significantly and, hence, it is expected that more user equipment will use the enhanced cell_FACH state.

In HSUPA operating in enhanced cell_FACH, the base station has a pool of common enhanced dedicated channel (E-DCH) resources. The common E-DCH resources consist of up to 32 E-DCH channels which are shared by all user equipment supporting HSUPA in enhanced cell_FACH. In some releases, the E-DCH resource is restricted to operate only in either a 2 ms transmission time interval (TTI) or a 10 ms TTI. That is to say that a mixture of 2 ms and 10 ms TTI operation is not possible. It will be appreciated that the 2 ms TTI operation gives a higher throughput and lower delay compared to the operation in 10 ms TTI. However, the 10 ms TTI operation provides for a larger coverage area than that of the 2 ms TTI operation.

User equipment that is not capable of HSUPA in enhanced cell_FACH can use the random access channel (RACH) for uplink transmission, whilst user equipment capable of HSUPA in enhanced cell_FACH is restricted to use the common E-DCH resource for uplink transmission. Given that it is expected that more user equipment will use the enhanced cell_FACH state, the common E-DCH resource is likely to get congested during busy periods.

Release 11 recognised these restrictions in enhanced cell_FACH and further improvements were introduced. In Release 11, concurrent 2 ms TTI and 10 ms TTI is provided. Also, user equipment supporting HSUPA in the enhanced cell_FACH state is allowed to use the RACH, thereby offering additional resource to the base station which can assist in congestion relief of the common E-DCH resource.

RACH, E-DCH in 2 ms TTI, E-DCH in 10 ms TTI, E-DCH in MAC-e/es and E-DCH in MAC-i/is uplink resources are configured by the RNC. Hence, an RRC radio bearer (RB) reconfiguration is required to change the UE from one to another. However, these resources are managed by the base station. Furthermore, RRC RB reconfiguration is usually slow and may not adapt quickly enough to the needs of user equipment and base stations. For example, if user equipment is at a cell edge, it is beneficial to be able to switch quickly from E-DCH-2 ms to E-DCH-10 ms before the user equipment throughput degrades.

Accordingly, a method of configuring transmissions is provided. The method may comprise the step of preconfiguring user equipment to support transmissions using more than one transport channel of a radio bearer. The transport channels may be associated with a particular communication state of the user equipment. Each of the transport channels may be associated with logical channels which provide information to be transmitted by the transport channels. The method may comprise the step of re-mapping the logical channels from one of the transport channels to another of the transport channels in response to a transmitted message. The transmitted message may provide an indication of that transport channel to which information from the logical channels will be provided.

Accordingly, for each communication state of the user equipment, the user equipment may be preconfigured to provide information from logical channels to any one of a number of different transport or traffic channels associated with a particular communication state. This enables different transport channels to be preconfigured to be selected to transmit information provided by the logical channels. The transport channel which is used to transmit the information from the logical channels may be changed by re-mapping the logical channels onto that new transport channel in response to a message transmitted between the base station and the user equipment.

It will be appreciated that this approach enables the user equipment or base station to select a transport channel to carry the information from the logical channels autonomously of other network nodes within the network, such as, for example, the RNC. By avoiding the need to involve other network nodes in the reselection of the transport channel, rapid changes in the mapping of logical channels to transport channels can be made based on knowledge of the current conditions within either the base station or the user equipment. This approach enables fast switching of the transport channel to improve the performance of the network.

In one embodiment, the step of remapping comprises remapping the logical channels onto the different one of the plurality of transport channels in response to one of a layer 1 and a layer 2 message indicating the different one of the plurality of transport channels transmitted between the base station and the user equipment. Accordingly, a layer 1 and/or a layer 2 message may be transmitted between the base station and the user equipment to indicate the new transport channel to be used. It will be appreciated that the use of such layer 1 and layer 2 messaging enables a fast change in transport channel to be effected.

In one embodiment, the step of remapping comprises remapping the logical channels onto the different one of the plurality of transport channels in response to a non-layer 3 message indicating the different one of the plurality of transport channels transmitted between the base station and the user equipment. Hence, a message other than a layer 3 message (which typically involves the RNC or other higher-level network node) may be used which significantly speeds the reselection of the transport channel.

In one embodiment, the step of remapping comprises remapping the logical channels onto the different one of the plurality of transport channels in response to information transmitted over the different one of the plurality of transport channels. Accordingly, rather than sending an explicit message, instead information may be provided over a transport channel which differs to the transport channel currently being used and reception of that information over that channel will indicate that the new transport channel is to be used. This may allow, for example, user equipment to indicate a change in uplink transport channel to a base station or a base station to indicate a change in downlink transport channel to user equipment.

In one embodiment, the plurality of transport channel support communication in a first direction between said base station and user equipment and the step of remapping comprises remapping the logical channels onto a different one of the plurality of transport channels in response to a message transmitted between the base station and the user equipment over one a plurality of opposing transport channels corresponding to the different one of the plurality of transport channels, said opposing transport channels supporting communication in a second direction between said base station and user equipment. Accordingly, again, rather than sending an explicit message, a change in transport channel may be indicated through transmissions being received on an opposing transport channel which corresponds to a new transport channel being used. For example, a transport channel in downlink which is equivalent to, for example, the RACH or E-DCH transport channel in uplink may be used to make transmissions to the user equipment and this may indicate to the user equipment to switch the transport channel in uplink to that equivalent transport channel.

In one embodiment, the method comprises the step of instructing adjustment of the preconfiguring of the user equipment to support transmissions over an adjusted plurality of transport channels of the radio bearer, each of the adjusted plurality of transport channels being mappable with logical channels of the radio bearer. Accordingly, the preconfigured transport channels associated with a communication state may be changed. Being able to change the preconfigured transport channels enables a reduced set of transport channels to be preconfigured at any one particular time which helps to reduce the resources consumed as a result of this preconfiguration. By enabling the preconfigured transport channels to be changed, the particular sub-set of transport channels which are preconfigured for use may be adjusted to any of the possible transport channels for that communication state.

In one embodiment, said radio bearer and said plurality of transport channel support transmissions in a first direction between said base station and user equipment, the method comprises the step of remapping opposing logical channels on an opposing radio bearer between the base station and the user equipment supporting transmissions in a second direction between said base station and user equipment over a plurality of opposing transport channels onto a different one of the plurality of opposing transport channels corresponding to the different one of the plurality of transport channels. Accordingly, changing the transport channel for transmissions in one direction may also result in a consequential change of transport channel for transmissions in an opposing direction. For example, causing a remapping in the uplink transport channel to be may result in a consequential remapping of the downlink transport channel.

In one embodiment, the step of remapping comprises remapping the logical channels onto a different one of the plurality of transport channels in response to information from the user equipment, the different one of the plurality of transport channels being determined to provide for improved transmissions between the base station and the user equipment based on the information from the user equipment.

Accordingly, on receipt of information from the user equipment a determination of the most appropriate transport channel for that user equipment may be made and that transport channel selected by re-mapping the logical channels onto that new transport channel.

In one embodiment, the level 1 message comprises at least one of a High Speed Shared Control Channel (HS-SCCH) order and a message sent over at least one of Acquisition Indicator Channel (AICH), E-DCH Absolute Grant Channel (E-AGCH) and E-DCH Relative Grant Channel (E-RGCH).

In one embodiment, the plurality of transport channels comprise transport channels having at least one of differing transmission time intervals, differing header compression, differing encoding and differing data packet sizes. Accordingly, the transport channels may support transmissions with different characteristics. For example, transport channels having different transmission time intervals, different header compressions, different encoding or data packet sizes may each be considered to be different transport channels, each of which may be preconfigured.

In one embodiment, the plurality of transport channels comprises the random access channel (RACH) and the enhanced dedicated channel (E-DCH).

In one embodiment, the plurality of transport channels comprise E-DCH configured with differing characteristics.

In one embodiment, the plurality of transport channels comprise E-DCH configured with at least two of a 2 millisecond transmission time interval, a 10 millisecond transmission time interval, MAC-e/es and MAC-i/is.

In one embodiment, the method comprises the step of preconfiguring the user equipment to support transmissions over a plurality of transport channels for each of a plurality of communication states. Hence, the mapping may be preconfigured for transport channels of each of the communication or connection states.

According to a second aspect, there is provided a base station operable to configure transmissions with user equipment over a radio bearer a wireless telecommunication network, the base station comprising: preconfiguring logic operable to preconfigure the user equipment to support transmissions over a plurality of transport channels of the radio bearer, the plurality of transport channels being associated with a communication state of the user equipment, each of the plurality of transport channels being mappable with logical channels of the radio bearer, the logical channels providing information to be transmitted by the transport channels; and remapping logic operable to remap the logical channels onto a different one of the plurality of transport channels in response to a message transmitted between the base station and the user equipment, the message indicating the different one of the plurality of transport channels to be used to support the transmissions between the base station and the user equipment.

In one embodiment, the remapping logic is operable to remap the logical channels onto the different one of the plurality of transport channels in response to one of a layer 1 and a layer 2 message indicating the different one of the plurality of transport channels transmitted between the base station and the user equipment.

In one embodiment, the remapping logic is operable to remap the logical channels onto the different one of the plurality of transport channels in response to a non-layer 3 message indicating the different one of the plurality of transport channels transmitted between the base station and the user equipment.

In one embodiment, the remapping logic is operable to remap the logical channels onto the different one of the plurality of transport channels in response to information transmitted over the different one of the plurality of transport channels.

In one embodiment, said plurality of transport channel support communication in a first direction between said base station and user equipment and the remapping logic is operable to remap the logical channels onto a different one of the plurality of transport channels in response to a message transmitted between the base station and the user equipment over one a plurality of opposing transport channels corresponding to the different one of the plurality of transport channels, said opposing transport channels supporting communication in a second direction between said base station and user equipment.

In one embodiment, the preconfiguring logic is operable to instruct adjustment of the preconfiguring the user equipment to support transmissions over an adjusted plurality of transport channels of the radio bearer, each of the adjusted plurality of transport channels being mappable with logical channels of the radio bearer.

In one embodiment, said radio bearer and said plurality of transport channel support transmissions in a first direction between said base station and user equipment and the remapping logic is operable to remap opposing logical channels on an opposing radio bearer between the base station and the user equipment supporting transmissions in a second direction between said base station and user equipment over a plurality of opposing transport channels onto a different one of the plurality of opposing transport channels corresponding to the different one of the plurality of transport channels.

In one embodiment, the remapping logic is operable to remap the logical channels onto a different one of the plurality of transport channels in response to information from the user equipment, the different one of the plurality of transport channels being determined to provide for improved transmissions between the base station and the user equipment based on the information from the user equipment.

In one embodiment, the level 1 message comprises at least one of an HS-SCCH order and message sent over at least one of AICH, E-ARGH and E-RGCH.

In one embodiment, the plurality of transport channels comprise transport channels having at least one of differing transmission time intervals, differing header compression, differing encoding and differing data packet sizes.

In one embodiment, the plurality of transport channels comprises RACH and E-DCH.

In one embodiment, the plurality of transport channels comprise E-DCH configured with differing characteristics.

In one embodiment, the plurality of transport channels comprise E-DCH configured with at least two of a 2 millisecond transmission time interval, a 10 millisecond transmission time interval, MAC-e/es and MAC-i/is.

In one embodiment, the preconfiguring logic is operable to preconfigure the user equipment to support transmissions over a plurality of transport channels for each of a plurality of communication states.

According to a third aspect, there is provided user equipment operable to configure transmissions with a base station over a radio bearer a wireless telecommunication network, the user equipment comprising: preconfiguring logic operable to preconfigure the user equipment to support transmissions over a plurality of transport channels of the radio bearer, the plurality of transport channels being associated with a communication state of the user equipment, each of the plurality of transport channels being mappable with logical channels of the radio bearer, the logical channels providing information to be transmitted by the transport channels; and remapping logic operable to remap the logical channels to a different one of the plurality of transport channels in response to a message transmitted between the base station and the user equipment, the message indicating the different one of the plurality of transport channels to be used to support the transmissions between the base station and the user equipment.

In one embodiment, the remapping logic is operable to remap the logical channels onto the different one of the plurality of transport channels in response to one of a layer 1 and a layer 2 message indicating the different one of the plurality of transport channels transmitted between the base station and the user equipment.

In one embodiment, the remapping logic is operable to remap the logical channels onto the different one of the plurality of transport channels in response to a non-layer 3 message indicating the different one of the plurality of transport channels transmitted between the base station and the user equipment.

In one embodiment, the remapping logic is operable to remap the logical channels onto the different one of the plurality of transport channels in response to information transmitted over the different one of the plurality of transport channels.

In one embodiment, the preconfiguring logic is operable to adjust the preconfiguring the user equipment to support transmissions over an adjusted plurality of transport channels of the radio bearer, each of the adjusted plurality of transport channels being mappable with logical channels of the radio bearer.

In one embodiment, said radio bearer and said plurality of transport channel support transmissions in a first direction between said base station and user equipment and the remapping logic is operable to remap opposing logical channels on an opposing radio bearer between the base station and the user equipment supporting reverse transmissions in a second direction between said base station and user equipment over a plurality of opposing transport channels to a different one of the plurality of opposing transport channels corresponding to the different one of the plurality of transport channels.

In one embodiment, the level 1 message comprises at least one of an HS-SCCH order and message sent over at least one of AICH, E-AGCH and E-RGCH.

In one embodiment, the plurality of transport channels comprise transport channels having at least one of differing transmission time intervals, differing header compression, differing encoding and differing data packet sizes.

In one embodiment, the plurality of transport channels comprises RACH and E-DCH.

In one embodiment, the plurality of transport channels comprise E-DCH configured with differing characteristics.

In one embodiment, the plurality of transport channels comprise E-DCH configured with at least two of a 2 millisecond transmission time interval, a 10 millisecond transmission time interval, MAC-e/es and MAC-i/is.

In one embodiment, the preconfiguring logic is operable to preconfigure the user equipment to support transmissions over a plurality of transport channels for each of a plurality of communication states.

According to a fourth aspect, there is provided a method corresponding to the steps performed by the user equipment of the third aspect.

According to a fifth aspect, there is provided a radio network controller operable to configure transmissions with user equipment over a radio bearer a wireless telecommunication network, the radio network controller comprising: preconfiguring logic operable to preconfigure the user equipment to support transmissions over a plurality of transport channels of the radio bearer, the plurality of transport channels being associated with a communication state of the user equipment, each of the plurality of transport channels being mappable with logical channels of the radio bearer, the logical channels providing information to be transmitted by the transport channels.

In one embodiment, the radio network controller comprises remapping logic operable to remap the logical channels onto the different one of the plurality of transport channels in response to information transmitted over the different one of the plurality of transport channels.

In one embodiment, the preconfiguring logic is operable to adjust the preconfiguring the user equipment to support transmissions over an adjusted plurality of transport channels of the radio bearer, each of the adjusted plurality of transport channels being mappable with logical channels of the radio bearer.

In one embodiment, said radio bearer and said plurality of transport channel support transmissions in a first direction between said base station and user equipment and the radio network controller comprises remapping logic operable to remap opposing logical channels on an opposing radio bearer between the base station and the user equipment supporting transmissions in a second direction between said base station and user equipment over a plurality of opposing transport channels onto a different one of the plurality of opposing transport channels corresponding to the different one of the plurality of transport channels.

In one embodiment, the remapping logic is operable to remap the logical channels onto a different one of the plurality of transport channels in response to information from the user equipment, the different one of the plurality of transport channels being determined to provide for improved transmissions between the base station and the user equipment based on the information from the user equipment.

In one embodiment, the plurality of transport channels comprise transport channels having at least one of differing transmission time intervals, differing header compression, differing encoding and differing data packet sizes.

In one embodiment, the plurality of transport channels comprises RACH and E-DCH.

In one embodiment, the plurality of transport channels comprise E-DCH configured with differing characteristics.

In one embodiment, the plurality of transport channels comprise E-DCH configured with at least two of a 2 millisecond transmission time interval, a 10 millisecond transmission time interval, MAC-e/es and MAC-i/is.

In one embodiment, the preconfiguring logic is operable to preconfigure the user equipment to support transmissions over a plurality of transport channels for each of a plurality of communication states.

According to a sixth aspect, there is provided a method corresponding to the steps performed by the radio network controller of the fifth aspect.

According to a seventh aspect, there is provided a computer program product operable, when executed on a computer, to perform the method steps of the first, fourth or sixth aspects.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 7:
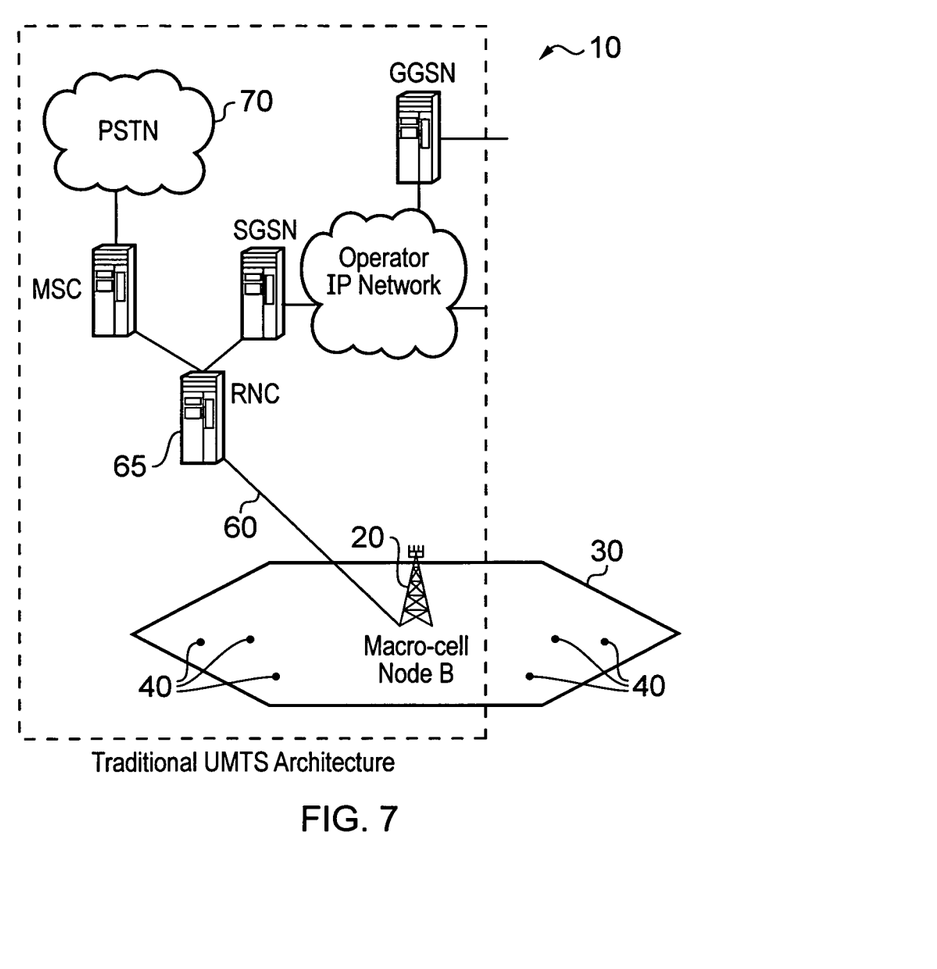
FIG. 7 illustrates the main components of a telecommunications network according to one embodiment.

FIG. 7 illustrates a wireless telecommunications system 10 according to one embodiment. User equipment 40 roam through the wireless telecommunications system. Base stations 20 are provided which support areas of radio coverage or cells 30. A number of such base stations 20 are provided and are distributed geographically in order to provide a wide area of coverage to user equipment 40. When user equipment is within an area served by a base station 30, communications may be established between the user equipment and the base station over associated radio links or bearers. Each base station typically supports a number of sectors within the geographical area of service 30. Of course it will be appreciated that FIG. 7 illustrates a small subset of the total number of user equipment and base stations that may be present in a typical communication system.

The wireless communications system is managed by a Radio Network Controller (RNC) 65. The RNC 65 controls operation of the wireless communications system by communicating with a plurality of base stations over a backhaul communications link 60. The network controller also communicates with user equipment 40 via each base station and thus effectively manages the entire wireless communications system.

User equipment 40 typically transmits information and data to a base station 20 so that it can be re-routed within a wireless telecommunications network. User equipment may, for example, need to transmit data to the base station in order to relay text messages, voice information when a user is using the equipment to make a telephone call, or other data. The base station 20, in combination with parameters set by the RNC 65, allocate a resource to user equipment in a manner that aims to optimise operation of the wireless telecommunications network 10. User equipment 40 can send data to a base station on one or more carriers known as "uplink carriers".

Overview

Before discussing embodiments in any more detail, first an overview will be provided. As mentioned above, user equipment can operate in one of a number of different communication states. Each of these communication states is optimized for particular user equipment traffic conditions or operational demands. Different transport channels are available to the user equipment when operating in these different communication or connection states. Although existing techniques enable different transport channels to be selected to support communication with the user equipment, this usually requires a radio resource connection radio bearer (RRC RB) reconfiguration. However, the RRC RB reconfiguration is usually slow and may not adapt quickly enough to the needs of the user equipment and the base station. This is because the RRC RB reconfiguration involves the radio network controller (RNC) and layer 3 messaging. Also, the RNC may not have knowledge of, for example, uplink resources, since the base station manages these resources.

Accordingly, a technique is provided which introduces the capability of autonomous selection of preconfigured radio bearer multiplexing (i.e. changing between different transport channels or between transport channels having different configurations) in the same communication or connection state (such as the RRC state of the user equipment). The user equipment will typically be preconfigured during the RRC connection setup process and each logical channel (such as Common Control Channel (CCCH), Dedicated Control Channel (DCCH), Dedicated Traffic Channel (DTCH), etc.) can be mapped onto a different transport channel resource (for example the three logical channels mentioned above may be mapped onto either Random Access Channel (RACH), Enhanced Dedicated Channel with 2 ms transmission time interval (TTI) (E-DCH-2 ms), E-DCH-10 ms, etc.); it will be appreciated that these transport channels are available in the enhanced cell_FACH state. Hence, the logical channels may be mapped onto any of five different transport channels in that connection state. It will be appreciated that in the cell_DCH state different transport channels including E-DCH in MAC-e/ee and E-DCH in MAC-i/is can be mapped.

Figure 1:
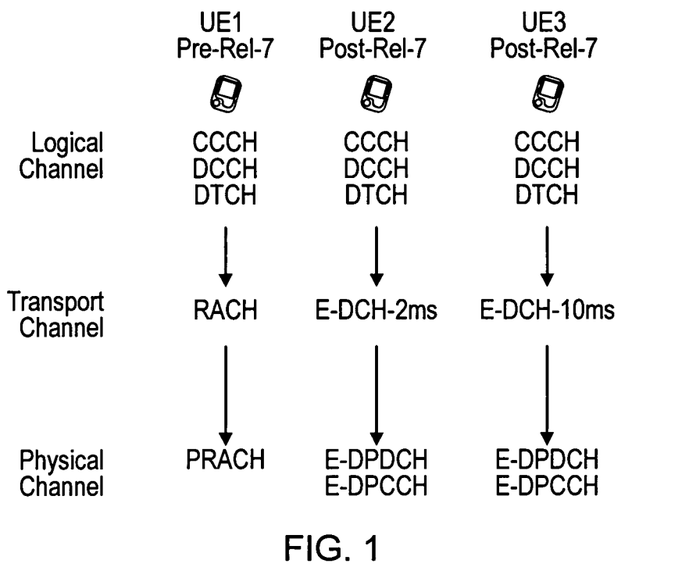
FIG. 1 illustrates a single mapping in the cell_FACH state.
Figure 2:
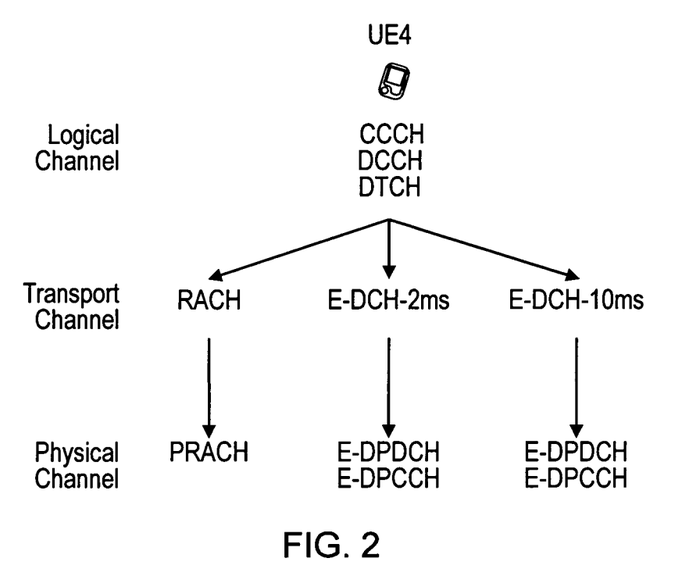
FIG. 2 illustrates multiple mapping in the cell_FACH state.

For example, FIG. 1 illustrates a single mapping in the cell_FACH state where there are three different types of user equipment. User equipment UE1 is a pre-release 7 user equipment and does not support HSUPA in the cell_FACH state. User equipment UE2 and UE3 are post-release 7 user equipment which support HSUPA in the cell_FACH state. In this example, the logical channels in the uplink are mapped to only one type of transport channel for each user equipment. However, FIG. 2 shows user equipment UE4 which is a release 11 user equipment where the logical channels can be mapped onto more than one transport channel. Since the user equipment UE4 has multiple mapping possibilities, the user equipment UE4 can send its traffic via any of the transport channels (that is to say, the logical channels CCCH, DCCH and DTCH can be mapped onto RACH, E-DCH-2 ms or E-DCH-10 ms without an RRC RB reconfiguration). Thus, by preconfiguring these mappings and providing a local mechanism between the user equipment and base station for changing the mapping, it is possible for a base station to switch the transport channel (and therefore the type of resource) a particular user equipment is using without sending messaging to the RNC. Instead, the base station can, for example, send a layer 1 instruction (such as an HS-SCCH order or other messages sent on the AICH, E-AGCH or E-RGCH physical channels) to the user equipment to switch from one type of transport channel or resource to another.

This approach recognizes that the base station manages the uplink resources and is in the best position to allocate these resources among the supported user equipment. Furthermore, this approach provides a fast mechanism to switch these transport channels or resources and allows the base station to react quickly to changes in its resources. For example, if there is a high level of interference, the base station can quickly reduce some user equipment resources from E-DCH-2 ms to E-DCH-10 ms.

Also, because the network and user equipment are preconfigured to operate using multiple mappings, it is possible for the user equipment to also change its transport channel or resource. Although it may not be necessary in all cases, the user equipment may also inform the network or request from the network (for example, the base station) changes in the mapping being used.

Such an approach provides autonomous selection of the transport channels, since this can be performed under base station or user equipment layer 1 control. Although techniques already exist to preconfigure user equipment with multiple traffic channel options, the selection of these options is based on either explicit RNC configuration of the transport channels using RRC messaging, or by the user equipment performing a cell reselection or state transition (i.e. a change in the RRC state). In contrast, this approach enables the user equipment to select autonomously, in the same RRC state, the transport channel or multiplex option based on user equipment criteria or in response to base station indication.

Through this approach it can be seen that it is possible for the transport channels used to support communication between the user equipment and base station to be changed autonomously and quickly without needing to wait for the slower layer 3 communication with the RNC.

Typically, the base station will inform the RNC of the combination of mappings required. For example, the RNC may only have two mappings (for example, RACH and E-DCH-2 ms), but the base station may deem that other mappings (for example an E-DCH-10 ms and E-DCH-2 ms mapping) is more appropriate for the current environment. The mappings may be limited because multiple mapping consumes resources (notably memory) at the RNC and the RNC may wish to limit the number of mappings per user equipment. Also, multiple mappings consume resources at the user equipment and hence it may be desirable there to limit the number of mappings available at the user equipment. The RNC will typically use an RRC RB reconfiguration to change the combination of mappings. In an extreme implementation, the RNC may only have one mapping and this approach allows the base station to change the transport channel of user equipment that does not support multiple mappings. However, this change is slower than that performed by a layer 1 instruction, since an RRC RB reconfiguration is required by the RNC. Accordingly, the base station can request the RNC to add or remove a mapping for user equipment. It will also be appreciated that multiple mappings can also be performed for downlink as well as uplink channels. Also, it will be appreciated that multiple mappings can also be performed in other RRC states.

Although the following embodiments describe the use of cell_FACH as an example RRC state, it will be appreciated that this approach may also be utilized in other states. Also, whilst the following examples describe a base station indication as a triggering mechanism, user equipment triggering could equally be performed.

EXAMPLE 1

Figure 3:
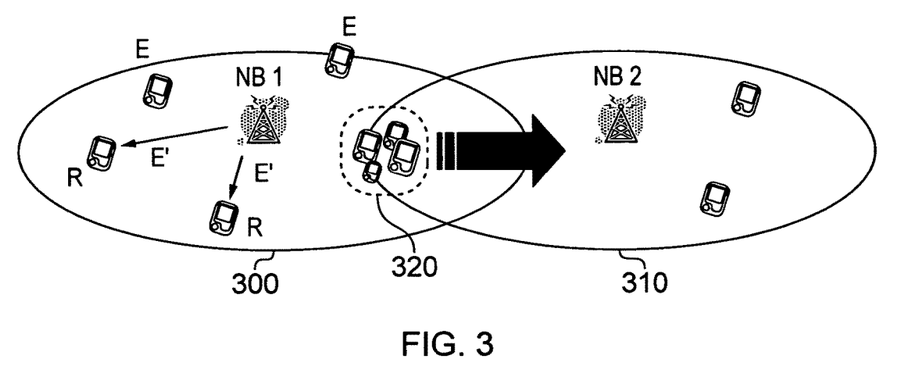
FIG. 3 illustrates an example operation within a wireless telecommunication network according to one embodiment.

FIG. 3 illustrates an example operation within a wireless telecommunication network according to one embodiment. Two base stations NB1 and NB2 are provided which provide cells 300, 310. User equipment 40 is provided within the cells 300, 310. This example assumes that the user equipment 40 illustrated are in the cell_FACH state (user equipment in other connection states are not illustrated to simplify explanation). Each user equipment 40 is configured to support multiple mappings such as that illustrated in FIG. 2 mentioned above. The mappings may be preconfigured as part of the RRC connection procedure.

Base station NB1 is suffering from congestion and so it has already switched some of the user equipment 40 to map their logical channels onto the RACH transport channel, denoted by an R in FIG. 3; the remainder are have their logical channels mapped onto the E-DCH channel, denoted by an E in FIG. 3.

A group of user equipment 320 move from cell 300 to cell 310 (for example, they are on a train or in a bus) and this group of user equipment 320 are now supported by base station NB2. This frees resources at base station NB1 and relieves its congestion. Accordingly, base station NB1 determines that it is more efficient for the remaining cell_FACH state user equipment within cell 300 to use E-DCH (either 2 ms TTI or 10 ms TTI) and so sends an HS-SCCH order to user equipment 40 having a mapping of their logical channels onto the RACH transport channel to now switch the mapping of their logical channels instead onto the E-DCH transport channel, denoted by an E' in FIG. 3.

Hence, it can be seen that each base station can change the mapping of logical channels onto different transport channels in order to make best use of resources and provide good service to user equipment. These changes can be effected between user equipment and base stations directly, without needing intervention from or reliance on the RNC.

EXAMPLE 2

Figure 4A:
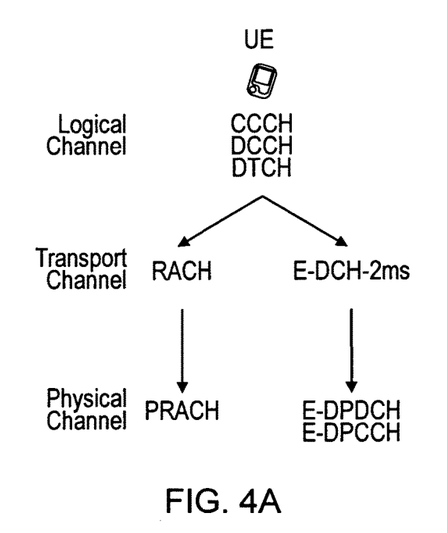
FIGS. 4A and 4B illustrate user equipment having a preconfigured dual transport channel mappings.

FIG. 4A illustrates user equipment 40 having a preconfigured dual transport channel mapping to either RACH or E-DCH-2 ms. That is to say, the user equipment is preconfigured to map its logical channels onto either of those two transport channels.

Figure 5:
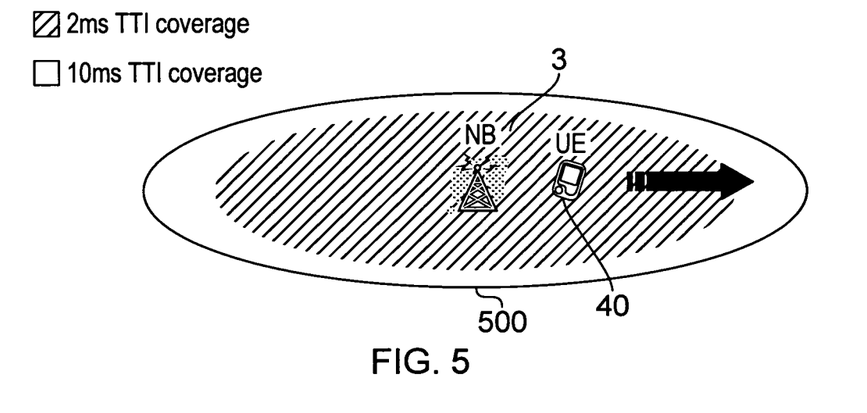
FIG. 5 illustrates user equipment within a cell.

As shown in FIG. 5, the user equipment 40 is within a cell 500 supported by the base station NB3. The user equipment 40 is close to the base station NB3, it is configured initially to transmit using E-DCH-2 ms and, hence, its logical channels are mapped onto this transport channel.

The user equipment 40 begins to move further away from base station NB3, as shown in FIG. 5, and out of the range of the coverage area provided by E-DCH-2 ms transmissions. The coverage using E-DCH-2 ms degrades as the user equipment 40 moves further away from the base station NB3.

Figure 6:
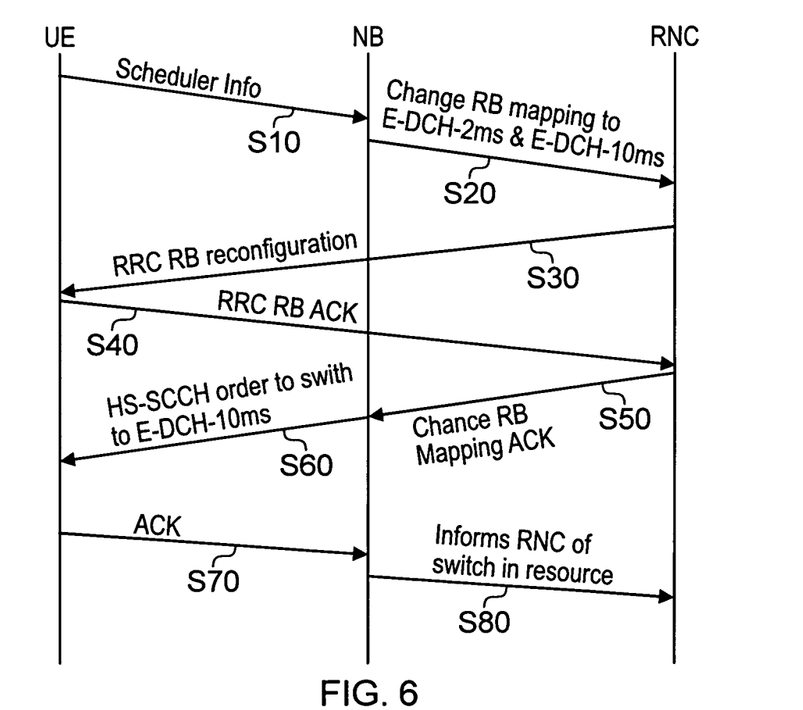
FIG. 6 illustrates example messaging when changing preconfigured mapping and remapping transport channels.

As shown in FIG. 6, from scheduler information sent from the user equipment 40 to the base station NB3 at step S10, the base station NB3 detects that this user equipment 40 is better suited to operate in E-DCH-10 ms, using the E-DCH-10 ms transport channel. Transmissions using E-DCH-10 ms have extended range compared to that using E-DCH-2 ms. However, the preconfigured mapping for this user equipment 40 does not include the E-DCH-10 ms transport channel. Instead, the only current option is to re-map the logical channels onto the RACH transport channel. Switching the user equipment 40 to operate in RACH will improve the coverage, but it causes the transmission to be frequently interrupted since the user equipment can only send one RACH transmission at a time and there is no Hybrid automatic repeat request (HARQ) protection on RACH.

Accordingly, at step S20, the base station NB3 requests the RNC to change the mapping combinations for this user equipment 40 before the user equipment 40 moves out of the E-DCH-2 ms coverage area.

Figure 4B:
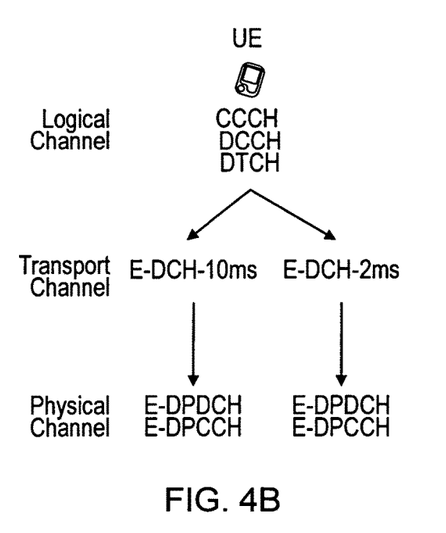

At step S30, the RNC transmits an RRC RB reconfiguration message to the user equipment 40 to change its mapping to that illustrated in FIG. 4b so that the user equipment 40 can now map its logical channels to either E-DCH-2 ms or E-DCH-10 ms.

At step S40, the user equipment 40 transmits an RRC RB reconfiguration acknowledgement message to the RNC and, at step S50, the RNC transmits a Change RB mapping acknowledgement message to the base station NB3.

The user equipment 40 then moves further out of the E-DCH-2 ms coverage area and, at step S60, the base station NB3 transmits an HS-SCCH order to the user equipment 40 to cause the user equipment 40 to re-map its logical channels onto E-DCH-10 ms. Thus, the user equipment 40 can continue to transmit its traffic uninterrupted.

At step S70, the user equipment 40 transmits an acknowledgement confirming the re-mapping to the base station NB3.

At step S80, the base station NB3 then informs the RNC of the change and the RNC resets the RLC and MAC entities. It will be appreciated that it is possible for the RNC to detect a change in mapping itself by monitoring the radio bearer.

In addition to the above embodiments, it will be appreciated that rather than sending an HS-SCCH order, other layer 1 or layer 2 messaging may be used. In addition, the user equipment may re-map their logical channels onto a different transport channel in uplink, in response to a change in the mapping of logical channels onto a transport channel in downlink. For example, a change in the downlink channel may cause a corresponding change in the mapping on a reverse channel such as the uplink channel. However, it will be appreciated that the mappings on the uplink and downlink channels may be asymmetric. Also, it will be appreciated that multiple different mappings may be provided for the different transmission states for the user equipment.

It will be appreciated that this approach allows a base station to quickly change the user equipment resources in uplink or downlink by re-mapping the logical channels onto different transport channels, thereby allowing quick response to changes in the status of resources. This approach allows faster changes to be performed by the base station than would be possible using a conventional RRC RB reconfiguration via the RNC. In addition, the base station is best placed to perform this re-mapping as has knowledge of the status of its resources. This approach is particularly useful for user equipment which operate in cell_FACH state by facilitating the fast and flexible use of resources, although this technique can readily be applied to other states.

As mentioned above, when the switching in traffic channel occurs, the RLC and MAC layers may also need to be re-set. It will be appreciated that it is possible for the RNC to detect a change in transport channel (for example, RACH to E-DCH), since it is preconfigured to operate on the different mappings and, hence, the RNC can perform these resets. Alternatively, the base station can explicitly indicate to the RNC when a change in mapping occurs so that the RNC can perform those resets.

A person of skill in the art would readily recognise that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of configuring transmissions over a radio bearer between a base station and user equipment of a wireless telecommunication network, said method comprising:

preconfiguring said user equipment to support transmissions over a plurality of transport channels of said radio bearer, said plurality of transport channels being associated with a communication state of said user equipment, each of said plurality of transport channels being mappable with logical channels of said radio bearer, said logical channels providing information to be transmitted by said transport channels; and
  remapping said logical channels onto a different one of said plurality of transport channels in response to a message transmitted between said base station and said user equipment, said message indicating said different one of said plurality of transport channels to be used to support said transmissions between said base station and said user equipment,
  wherein said message comprises a layer 1 message transmitted between said base station and said user equipment,
  wherein said layer 1 message comprises an indication of which one of said preconfigured channels to use,
  wherein said plurality of transport channels comprises RACH and E-DCH,
  wherein said preconfiguring comprises preconfiguring said user equipment to support transmissions over a plurality of transport channels for each of a plurality of communication states.

2. The method of claim 1, wherein said remapping comprises remapping said logical channels onto said different one of said plurality of transport channels in response to one of a layer 1 and a layer 2 message indicating said different one of said plurality of transport channels transmitted between said base station and said user equipment.

3. The method of claim 1, wherein said remapping comprises remapping said logical channels onto said different one of said plurality of transport channels in response to information transmitted over said different one of said plurality of transport channels.

4. The method of claim 1, wherein said plurality of transport channels support communication in a first direction between said base station and user equipment and said remapping comprises remapping said logical channels onto a different one of said plurality of transport channels in response to a message transmitted between said base station and said user equipment over one a plurality of opposing transport channels corresponding to said different one of said plurality of transport channels, said opposing transport channels supporting communication in a second direction between said base station and user equipment.

5. The method of claim 1, comprising adjusting the preconfiguring of said user equipment to support transmissions over an adjusted plurality of transport channels of said radio bearer, each of said adjusted plurality of transport channels being mappable with logical channels of said radio bearer.

6. The method of claim 1, wherein said radio bearer and said plurality of transport channel support transmissions in a first direction between said base station and user equipment, said method comprising remapping opposing logical channels on an opposing radio bearer between said base station and said user equipment supporting transmissions in a second direction between said base station and user equipment over a plurality of opposing transport channels onto a different one of said plurality of opposing transport channels corresponding to said different one of said plurality of transport channels.

7. The method of claim 6, wherein said remapping comprises remapping said logical channels onto a different one of said plurality of transport channels in response to information from said user equipment, said different one of said plurality of transport channels being determined to provide for improved transmissions between said base station and said user equipment based on said information from said user equipment.

8. The method of claim 1, wherein said plurality of transport channels comprise transport channels having at least one of differing transmission time intervals, differing header compression, differing encoding and differing data packet sizes.

9. The method of claim 1, wherein said plurality of transport channels comprise E-DCH configured with differing characteristics.

10. The method of claim 1, wherein said preconfiguring occurs during a Radio Resource Control connection setup process.

11. The method of claim 1, wherein said preconfiguring occurs during a Radio Resource Control reconfiguration process.

12. The method of claim 1, wherein said preconfiguring maps each logical channel onto a different transport channel.

13. The method of claim 1, wherein said preconfiguring maps each logical channel onto any transport channel for said communication state.

14. The method of claim 1, wherein said preconfiguring maps each logical channel onto each different transport channel.

15. The method of claim 1, wherein said preconfiguring maps CCCH onto one of RACH, E-DCH-2ms in MAC-e/es, E-DCH-2ms in MAC-i/is, E-DCH-10ms in MAC-e/es, E-DCH-10ms in MAC-i/is.

16. The method of claim 1, wherein said preconfiguring maps DCCH onto one of RACH, E-DCH-2ms in MAC-e/es, E-DCH-2ms in MAC-i/is, E-DCH-10ms in MAC-e/es, E-DCH-10ms in MAC-i/is.

17. The method of claim 1, wherein said preconfiguring maps DTCH onto one of RACH, E-DCH-2ms in MAC-e/es, E-DCH-2ms in MAC-i/is, E-DCH-10ms in MAC-e/es, E-DCH-10ms in MAC-i/is.

18. The method according to claim 1, further including transmitting said transmissions between the base station and the user equipment.

19. The method of claim 1, wherein said layer 1 message comprises an HS-SCCH order giving the indication of which one of said preconfigured channels to use.

20. A base station operable to configure transmissions with user equipment over a radio bearer in a wireless telecommunication network, said base station comprising:
  a processor configured to:
    preconfigure said user equipment to support transmissions over a plurality of transport channels of said radio bearer, said plurality of transport channels being associated with a communication state of said user equipment, each of said plurality of transport channels being mappable with logical channels of said radio bearer, said logical channels providing information to be transmitted by said transport channels; and
    remap said logical channels onto a different one of said plurality of transport channels in response to a message transmitted between said base station and said user equipment, said message indicating said different one of said plurality of transport channels to be used to support said transmissions between said base station and said user equipment;
  a transmitter configured to transmit said transmissions between the base station and the user equipment, wherein said message comprises a layer 1 message transmitted between said base station and said user equipment wherein said layer 1 message comprises an indication of which one of said preconfigured channels to use, wherein said plurality of transport channels comprises RACH and E-DCH, wherein said preconfiguring comprises preconfiguring said user equipment to support transmissions over a plurality of transport channels for each of a plurality of communication states.

21. The base station of claim 20, wherein said remapping comprises remapping said logical channels onto said different one of said plurality of transport channels in response to one of a layer 1 and a layer 2 message indicating said different one of said plurality of transport channels transmitted between said base station and said user equipment.

22. The base station of claim 20, wherein said layer 1 message comprises an HS-SCCH order giving the indication of which one of said preconfigured channels to use.

23. User equipment operable to configure transmissions with a base station over a radio bearer in a wireless telecommunication network, said user equipment comprising:
 a processor configured to:
  preconfigure said user equipment to support transmissions over a plurality of transport channels of said radio bearer, said plurality of transport channels being associated with a communication state of said user equipment, each of said plurality of transport channels being mappable with logical channels of said radio bearer, said logical channels providing information to be transmitted by said transport channels; and
  remap said logical channels to a different one of said plurality of transport channels in response to a message transmitted between said base station and said user equipment, said message indicating said different one of said plurality of transport channels to be used to support said transmissions between said base station and said user equipment;
 a transmitter configured to transmit said transmissions between the base station and the user equipment,
 wherein said message comprises a layer 1 message transmitted between said base station and said user equipment,
 wherein said layer 1 message comprises an indication of which one of said preconfigured channels to use,
 wherein said plurality of transport channels comprises RACH and E-DCH,
 wherein said preconfiqurinq comprises preconfiquring said user equipment to support transmissions over a plurality of transport channels for each of a plurality of communication states.

24. The user equipment of claim 23, wherein said remapping comprises remapping said logical channels onto said different one of said plurality of transport channels in response to one of a layer 1 and a layer 2 message indicating said different one of said plurality of transport channels transmitted between said base station and said user equipment.

25. The user equipment of claim 23, wherein said layer 1 message comprises an HS-SCCH order giving the indication of which one of said preconfigured channels to use.

26. A non-transitory computer readable medium, with computer program code executable on a computer or processor when said program is loaded said program code comprising:

preconfiguring said user equipment to support transmissions over a plurality of transport channels of said radio bearer, said plurality of transport channels being associated with a communication state of said user equipment, each of said plurality of transport channels being mappable with logical channels of said radio bearer, said logical channels providing information to be transmitted by said transport channels; and
 remapping said logical channels onto a different one of said plurality of transport channels in response to a message transmitted between said base station and said user equipment, said message indicating said different one of said plurality of transport channels to be used to support said transmissions between said base station and said user equipment,
 wherein said message comprises a layer 1 message transmitted between said base station and said user equipment,
 wherein said layer 1 message comprises an indication of which one of said preconfigured channels to use,
 wherein said plurality of transport channels comprises RACH and E-DCH,
 wherein said preconfiguring comprises preconfiguring said user equipment to support transmissions over a plurality of transport channels for each of a plurality of communication states.

27. The non-transitory computer of claim 26, wherein said remapping comprises remapping said logical channels onto said different one of said plurality of transport channels in response to one of a layer 1 and a layer 2 message indicating said different one of said plurality of transport channels transmitted between said base station and said user equipment.

28. The non-transitory computer readable medium of claim 26, wherein said layer 1 message comprises an HS-SCCH order giving the indication of which one of said preconfigured channels to use.

29. A base station for configuring transmissions with user equipment over a radio bearer in a wireless telecommunication network, said base station comprising:
 a preconfigurer configured to preconfigure said user equipment to support transmissions over a plurality of transport channels of said radio bearer, said plurality of transport channels corresponding to a communication state of said user equipment, each of said plurality of transport channels being mappable with logical channels of said radio bearer, said logical channels providing information to be transmitted by said transport channels; and
 a remapper configured to remap said logical channels onto a different one of said plurality of transport channels in response to a message transmitted between said base station and said user equipment, said message indicating said different one of said plurality of transport channels to be used to support said transmissions between said base station and said user equipment,
 wherein said message comprises a layer 1 message transmitted between said base station and said user equipment,
 wherein said layer 1 message comprises an indication of which one of said preconfigured channels to use,
 wherein said plurality of transport channels comprises RACH and E-DCH,
 wherein said preconfiquring comprises preconfiquring said user equipment to support transmissions over a plurality of transport channels for each of a plurality of communication states.

30. The base station of claim 29, further comprising a processor configured to transmit said transmissions between the base station and the user equipment.

31. The base station of claim 29, wherein said remapping comprises remapping said logical channels onto said different one of said plurality of transport channels in response to one of a layer 1 and a layer 2 message indicating said different one of said plurality of transport channels transmitted between said base station and said user equipment.

32. The base station of claim 29, wherein said layer 1 message comprises an HS-SCCH order giving the indication of which one of said preconfigured channels to use.

33. User equipment for configuring transmissions with a base station over a radio bearer in a wireless telecommunication network, said user equipment comprising:
- a preconfigurer configured to preconfigure said user equipment to support transmissions over a plurality of transport channels of said radio bearer, said plurality of transport channels corresponding with a communication state of said user equipment, each of said plurality of transport channels being mappable with logical channels of said radio bearer, said logical channels providing information to be transmitted by said transport channels; and
- a remapper configured to remap said logical channels to a different one of said plurality of transport channels in response to a message transmitted between said base station and said user equipment, said message indicating said different one of said plurality of transport channels to be used to support said transmissions between said base station and said user equipment, wherein said message comprises a layer 1 message transmitted between said base station and said user equipment, wherein said layer 1 message comprises an indication of which one of said preconfigured channels to use, wherein said plurality of transport channels comprises RACH and E-DCH, wherein said preconfiguring comprises preconfiguring said user equipment to support transmissions over a plurality of transport channels for each of a plurality of communication states.

34. The user equipment of claim 33, further comprising a processor configured to transmit said transmissions between the base station and the user equipment.

35. The user equipment of claim 33, wherein said remapping comprises remapping said logical channels onto said different one of said plurality of transport channels in response to one of a layer 1 and a layer 2 message indicating said different one of said plurality of transport channels transmitted between said base station and said user equipment.

36. The user equipment of claim 33, wherein said layer 1 message comprises an HS-SCCH order giving the indication of which one of said preconfigured channels to use.

* * * * *